Jan. 17, 1933.  G. OLSON  1,894,414
BEARING
Filed Feb. 7, 1931
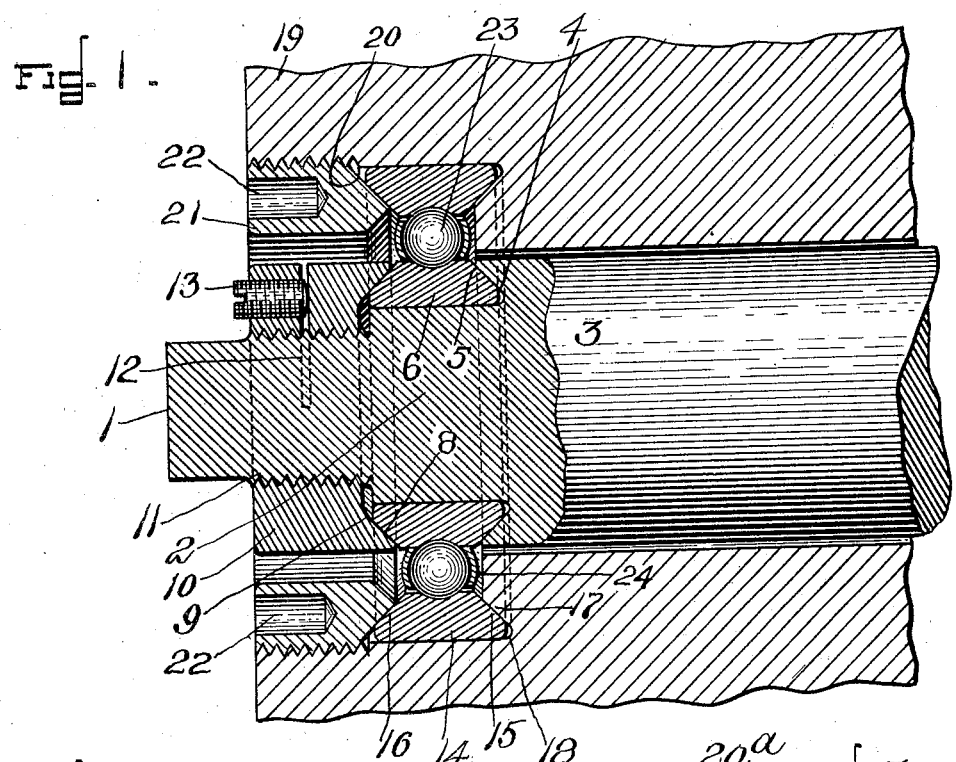
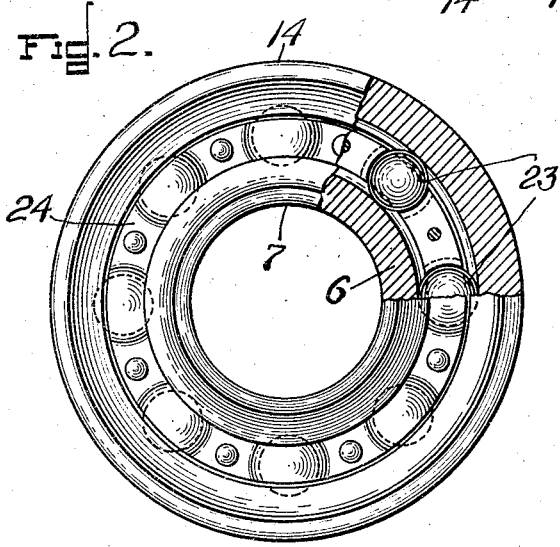
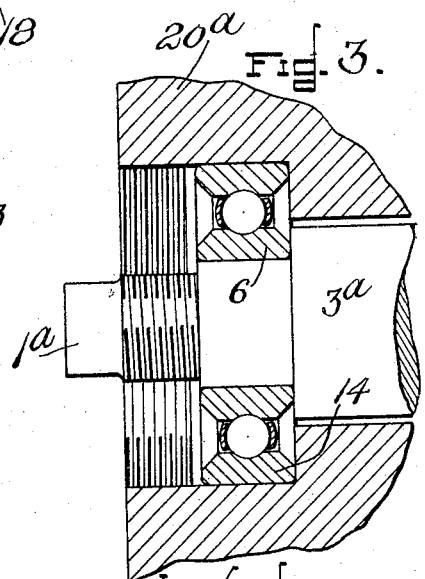
Inventor=
Gusten Olson.
By Arthur F. Randall
 Atty.

Patented Jan. 17, 1933

1,894,414

UNITED STATES PATENT OFFICE

GUSTEN OLSON, OF MEDFORD, MASSACHUSETTS

BEARING

Application filed February 7, 1931. Serial No. 514,088.

My invention relates to bearings, particularly shaft bearings, and it has for its object to improve the construction thereof.

Shaft bearings have heretofore been constructed with an inner one-piece race ring; an outer one-piece race ring, and a plurality of rolling members arranged in a circular series between, and within the races of, said rings. In those cases where the inner race ring was made of one-piece and directly mounted upon the shaft it has been applied to the latter by being forced thereon with a drive fit, the frictional engagement between said ring and the shaft being depended upon to insure rotation of the inner race ring with the shaft. This construction was objectionable because the inner race ring frequently would be split while being applied to or removed from the shaft; because of the difficulty in removing the inner race ring when necessary, because the connection between the ring and shaft was not always secure, and for other reasons.

My invention provides a shaft bearing construction wherein the inner race ring is slidably fitted on to the shaft and clamped securely against a shoulder provided on the latter, said shoulder being formed with a conical clutch surface that is complementary to, and fitted against, a conical clutch surface provided on the adjacent side of the inner race ring. The loosely fitting inner race ring is preferably clamped tightly against the conical surface of the shoulder by means of a clamping member adjustably mounted upon the shaft, and this clamping member also may be provided with a conical clutch face complementary to, and engaging, a conical clutch face on the adjacent side of the inner ring. The construction just described is simple and efficient and the inner race ring is securely fastened to the shaft so that it may be readily removed from the latter when desired.

Other features of my invention are hereinafter pointed out.

In the accompanying drawing:

Figure 1 is a sectional view of a shaft bearing construction embodying my invention.

Figure 2 is a side elevation partly in section, of the bearing unit forming part of the structure illustrated in Fig. 1.

Figure 3 illustrates another manner in which the bearing unit of Fig. 2 may be used in connection with a shaft and shaft support constructed as heretofore.

In the illustrated embodiment of my invention, 1 represents a shaft which is made with adjacent portions 2 and 3 which are of different diameters thus providing a shoulder 4 at the junction thereof. This shoulder 4 is made with a female conical clutch surface which is complementary to, and fits a male conical clutch surface 5 provided upon the adjacent side or face of an inner race ring 6. This inner race ring 6 is made with a cylindrical opening or aperture 7 that is fitted loosely upon the smaller cylindrical portion 2 of the shaft. That is, said ring 6 slidably but snugly fits the cylindrical portion 2 of the shaft so that when not clamped in position as hereinafter described it can be slid into position, or removed from said portion by the application of a comparatively small amount of force.

The opposite or outer side or face of the inner race ring 6 is formed with a male conical clutch surface 8 against which fits a complementary female conical clutch surface 9 provided upon the adjacent side or face of a nut 10. This nut 10 has threaded engagement with an exteriorly threaded portion 11 of shaft 1 and serves to hold the race ring 6 clamped tightly against the conical clutch surface 4 of the shaft. In this way the inner race ring 6 is tightly clutched to the shaft 1 so as to rotate with the latter.

The nut 10 is partially split transversely as at 12 and provided with a threaded aperture within which is mounted a screw 13 by means of which the nut is locked in its adjusted position on the shaft 1.

At 14 is shown the outer race ring of the bearing, said race ring having its opposite sides or faces provided with male conical clutch surfaces 15 and 16. The conical clutch surface 15 is complementary to and fits against a female conical clutch surface 17 provided at the bottom of a recess 18 that is formed within a shaft support 19.

The outer conical clutch surface 16 of the outer race ring is complementary to, and fits against, a male conical clutch surface 20 provided upon the inner side or face of a ring nut 21 which has threaded engagement with the interior of the recess 18. This ring nut 21 is made with sockets 22 for a spanner wrench by means of which it is screwed into and out of the recess.

The outer race ring 14 is loosely fitted to the recess 18 but it is held clamped immovable therein by means of the ring nut 21.

Between the inner and outer race rings 6 and 14 are provided the usual rolling members 23 occupying the races of said rings and the usual retainer 24.

The inner and outer race rings together with the retainer 24 and rolling members 23 make up a self-contained roller or ball bearing unit which is shown in side elevation in Fig. 2 and it is an advantage to the construction described above that the provision of the conical clutch surfaces upon the inner and outer sides or faces of the two rings does not, as illustrated in Fig. 3, prevent this bearing unit from being installed within a support 20a constructed as heretofore and upon a shaft 3a also constructed as heretofore.

It is an advantage to the construction illustrated in Figs. 1 and 2 that each race ring is fitted loosely to its support and normally clamped rigidly thereto by means which provide for the ready removal of the rings when desired or necessary.

It is also an advantage to this construction that the conical clutch surfaces are wedged together in a manner to securely hold each ring against movement with relation to the part to which it is secured.

What I claim is:—

A bearing comprising a shaft having two integral immediately adjacent cylindrical portions of different diameters providing an abrupt shoulder at the junction thereof, the portion of smallest diameter having its axis co-incident and parallel with the axis of said shaft and said shoulder being formed with a conical clutch face; an inner interiorly cylindrical one-piece jointless race ring slidably fitted directly upon the smaller cylindrical portion of said shaft in a position against said shoulder and having its opposite sides formed with conical clutch faces one of which is complementary to and fits against the conical clutch face of said shoulder; a clamping member adjustably and removably mounted upon said shaft at the opposite side of said race ring for clamping the latter forcibly against said shoulder, said clamping member being formed with a conical clutch face complementary to and engaging the adjacent conical clutch face of said inner race ring; an exteriorly cylindrical outer race ring; a one-piece support made with a cylindrical recess within which said outer race ring is slidably fitted; means fixedly clamping said outer ring within said recess and a circular series of rolling members between and occupying the races of said rings.

Signed by me at Boston, Suffolk County, Massachusetts, this 30th day of January, 1931.

GUSTEN OLSON.